United States Patent [19]

Kasai

[11] Patent Number: 5,680,522
[45] Date of Patent: Oct. 21, 1997

[54] PRINTER SYSTEM AND METHOD

[75] Inventor: Tadashi Kasai, Tokyo, Japan

[73] Assignee: Oki Data Corporation, Tokyo, Japan

[21] Appl. No.: 619,443

[22] Filed: Mar. 14, 1996

[30] Foreign Application Priority Data

Mar. 20, 1995 [JP] Japan ................................. 7-060901

[51] Int. Cl.$^6$ .................................................. G06K 15/00
[52] U.S. Cl. ........................................ 395/113; 395/116
[58] Field of Search ................................ 395/113, 114,
395/112, 115, 116, 101, 181, 182.14, 182.15,
183.01, 185.01, 184.01, 185.1; 358/437,
444, 404, 296; 347/5, 19, 132, 237, 247;
399/8, 9, 10–11, 16–17, 18–21; 400/76

[56] References Cited

U.S. PATENT DOCUMENTS

| | | | |
|---|---|---|---|
| 4,586,147 | 4/1986 | Tadokoro | 395/185.01 |
| 4,860,119 | 8/1989 | Maniwa et al. | 358/296 |
| 5,018,081 | 5/1991 | Yamaguchi et al. | 395/113 |
| 5,210,823 | 5/1993 | Moroi | 395/116 |
| 5,220,645 | 6/1993 | Nakajima | 395/113 |
| 5,467,435 | 11/1995 | Douglas et al. | 395/114 |

FOREIGN PATENT DOCUMENTS 246091  4/1992  Japan .

Primary Examiner—Edward L. Coles, Sr.
Assistant Examiner—Dov Popovici
Attorney, Agent, or Firm—Rabin, Champagne & Lynt, P.C.

[57] ABSTRACT

A printer system comprising a host including a page buffer for storing bit map data for one page or more and a printer including a controller, a receiving buffer for temporarily storing the bit map data sent from the page buffer, a band buffer for temporarily storing line unit data for several lines in a main scanning direction, a paper conveyer, an image forming section, and a sensor for detecting the paper passing through a predetermined position which is downstream in a paper conveying direction from the image forming section. Immediately after the one-line printing process is conducted, the line unit data used for the one-line printing process are erased from the band buffer, the bit map data used for the one-line printing process are erased from the receiving buffer, but the bit map data stored in the page buffer continues to be kept. If the controller judges that a paper jam has occurred on the basis of a signal sent from the sensor, the bit map data of the jammed page kept in the page buffer are sent again to the receiving buffer.

18 Claims, 9 Drawing Sheets

PRINTER SYSTEM AND METHOD

BACKGROUND OF THE INVENTION

The present invention relates to a printer system having a recovery function whereby in the event a paper jam has occurred, a missing page is printed anew.

In a conventional printer system, print data sent from a host are received and stored by a receiving buffer of a printer. The receiving buffer is provided together with a spreading buffer in a RAM of the printer. When the print data for one page has been stored in the receiving buffer, the print data expressed by page description language are transferred and spread as bit map data in the spreading buffer on the basis of font data. When the bit map data for one page has been stored in the spreading buffer, a printing operation for the corresponding page is performed by an engine of the printer.

Immediately after the host has completed sending the print data of the first page to the printer, it sends the print data of the second page to the printer. The receiving buffer of the printer therefore has a storage capacity for storing the print data of two or more pages. When the receiving buffer is filled with the print data, the host temporarily stops sending the subsequent print data. Immediately after completion of printing of the first page, the printer begins printing the second page according to the bit map data of the second page which has already been stored in the spreading buffer.

Such printer system has a recovery function whereby if a paper jam has occurred after the image forming process, the missing page is again printed. In this case, the print data of the printed page are stored in the receiving buffer until the paper which has a printed image is normally ejected from the printer.

If a paper jam has occurred, the paper transport and the image forming process of the succeeding page are stopped. When the operator has removed the jammed paper from the transport path of the printer and resumes printing, the print data of the jammed page are read out from the receiving buffer and spread as the bit map data in the spreading buffer to perform printing again. On the other hand, if a paper is normally ejected from the printer, the print data of the corresponding page are erased from the receiving buffer. The print data of the succeeding page, the transmission of which is temporarily stopped, are sent from the host to the receiving buffer and stored in the vacated area of the receiving buffer where the print data are erased.

In the above-mentioned printer system, it is necessary that print data for two pages or more expressed by page description language are stored in the receiving buffer and the bit map data for one page or more are stored in the spreading buffer. As a result, large storage capacity is required for the RAM including the receiving and spreading buffers, thereby contributing to high cost of the printer system.

SUMMARY OF THE INVENTION

The object of the present invention is to provide a printer system having a recovery function which can eliminate the needs for large storage capacity of the memory of the printer and high performance of the CPU of the printer.

According to the present invention, a printer system comprises a host and a printer. The host includes a page buffer for storing bit map data for one page or more, the bit map data stored in the page buffer being sent to the printer by the host. The printer includes a controller, a receiving buffer for temporarily storing the bit map data sent from the page buffer, a band buffer for temporarily storing line unit data for several lines in a main scanning direction, the line unit data being produced from the bit map data stored in the receiving buffer by the controller, a paper conveyer for conveying a paper, an image forming section for conducting an one-line printing process in the main scanning direction based on the line unit data to form an image on the paper, and a sensor for detecting the paper passing through a predetermined position which is downstream in a paper conveying direction from the image forming section. Immediately after the one-line printing process is conducted, the line unit data used for the one-line printing process are erased from the band buffer, the bit map data used for the one-line printing process are erased from the receiving buffer, but the bit map data stored in the page buffer continue to be kept. If the controller judges that a paper jam has occurred on the basis of the signal sent from the sensor, the bit map data of a jammed page kept in the page buffer are sent again to the receiving buffer by the host.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Preferred embodiments of the present invention will be described with reference to the attached drawings.

First Embodiment

Figure 1:
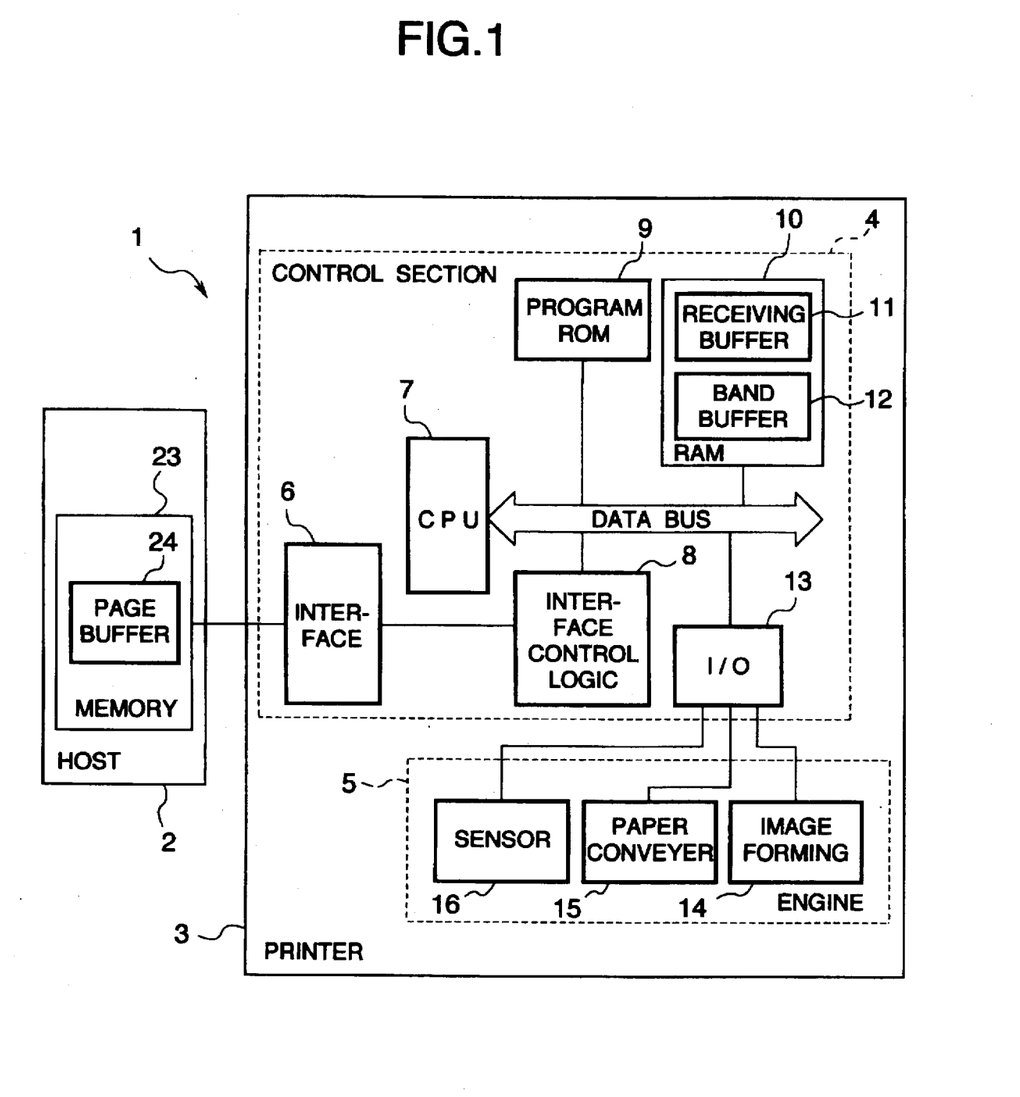
FIG. 1 is a block diagram showing construction of a printer system 1 according to a first embodiment of the present invention.

FIG. 1 is a block diagram showing construction of a printer system 1 according to the first embodiment. As shown in FIG. 1, the printer system 1 comprises a host 2 such as a personal computer and a printer 3 such as a laser beam printer or an LED printer using electrophotographic technique.

The host 2 comprises a memory 23 including a page buffer 24 for spreading and storing bit map data for one page or more, the bit map data being produced by the host 2 from print data expressed in page description language.

The printer 3 comprises a control section 4 for controlling the whole printing operation of the printer 3 and an engine 5 for conducting the printing operation.

The control section 4 of the printer 3 comprises an interface 6, a CPU (central processing unit) 7, an interface control logic section 8, a program ROM (read only memory) 9, a RAM (random access memory) 10 including a receiving buffer 11 and a band buffer 12, and an I/O (input/output) port 13. The CPU 7 is electrically connected via the interface 6 to the host 2 and also connected via data bus to the interface control logic section 8, the program ROM 9, the RAM 10 and the I/O port 13. The CPU 7 causes the receiving buffer 11 to store the bit map data sent from the host 2 and to erase the bit map data according to the program contained in the program ROM 9. The storage capacity of the receiving buffer 11 is less than an amount of the bit map data for one page, and equal to an amount of about 200 lines (a term "line" means, for example, a scanning line in a main scanning direction of a laser beam printer or an LED printer) with resolution of 600 [DPI]. However, the storage capacity of the receiving buffer 11 may be equal to or more than an amount of the bit map data for one page. The bit map data stored in the receiving buffer 11 are outputted and converted by the CPU 7 into line unit data to be stored in the band buffer 12. The band buffer 12 stores the line unit data for several lines.

The engine 5 of the printer 3 comprises an image forming section 14 for forming an image on a paper using electro-photographic technique, a paper conveyer 15 for conveying the paper from a paper cassette (not shown) through the image forming section 14 to an exit tray (not shown), and a sensor 16 for detecting the paper passing through a predetermined position which is downstream in a paper conveying direction from the image forming section 14 and outputting a paper detect signal to the CPU 7. The image forming section 14, the paper conveyer 15 and the sensor 16 are electrically connected via the I/O port 13 and the data bus to the CPU 7.

The image forming section 14 comprises, for example, a photosensitive drum (not shown), a charger (not shown) for charging the photosensitive drum, an image scanner (not shown) such as a laser beam scanner or an LED array for forming an electrostatic latent image on the photosensitive drum, a developing unit (not shown) for developing the electrostatic latent image, and a transfer unit (not shown) for transferring the developed toner image to the paper, and a fuser (not shown) for heating and fixing the image on the paper. The image forming section 14 performs the image forming process (i.e., printing process) including the steps of one-line printing (or scanning) the photosensitive drum to form an electrostatic latent image, developing the electrostatic latent image to form a toner image on the photosensitive drum, transferring the toner image to the paper and fixing the transferred toner image on the paper. At the one-line printing process, the image forming section 14 scans one line at a time on the basis of the line unit data stored in the band buffer 12. The one-line printing process is started after an amount of the line unit data stored in the band buffer exceeds a predetermined value.

The sensor 16 Is composed of, for example, a photointerrupter or a mechanical driven member for optically or mechanically detecting the paper passing through the predetermined position which is downstream in the paper conveying direction from the image forming section 14.

Figure 2:
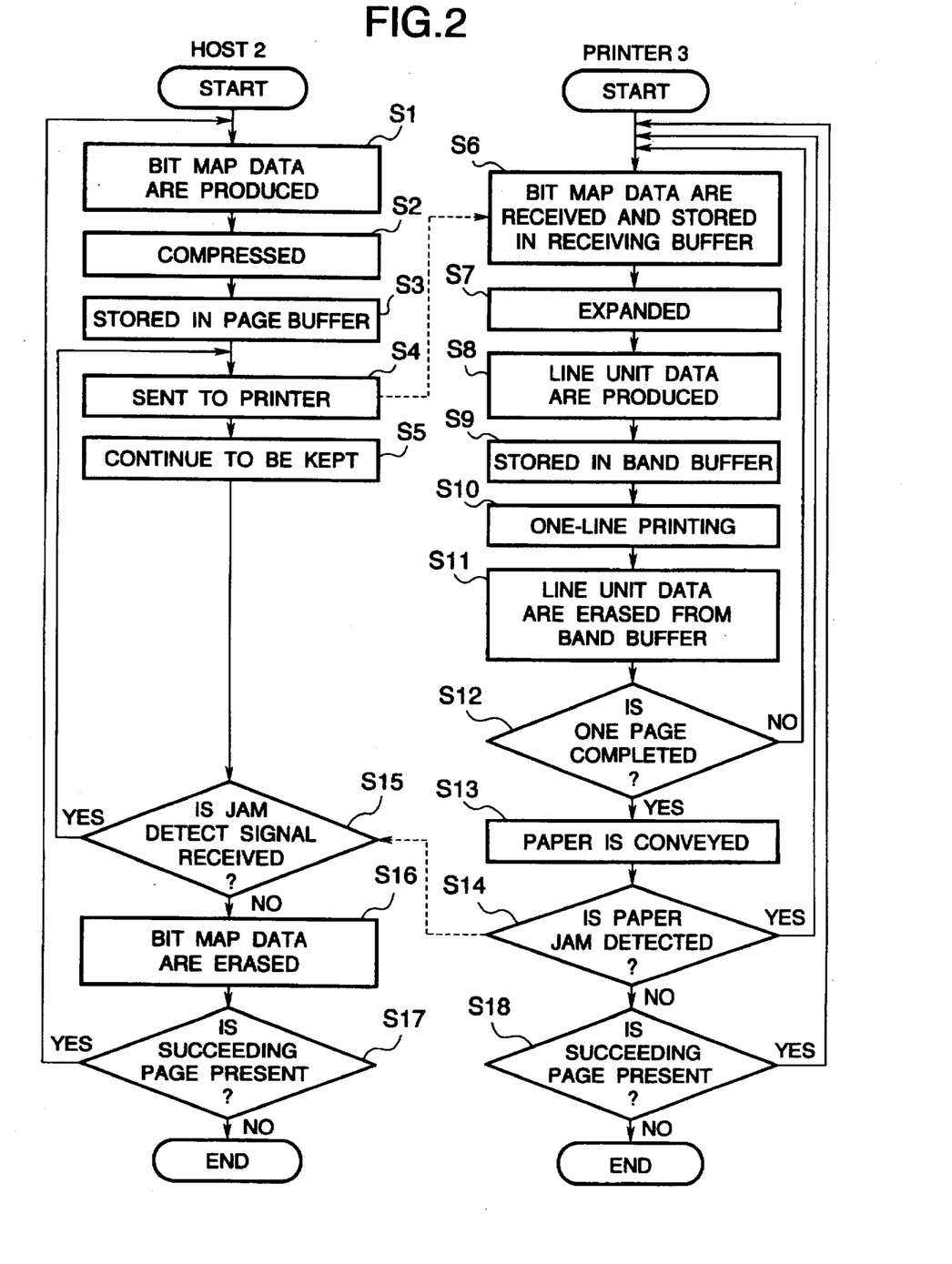
FIG. 2 is a flowchart indicating the operation of the printer system 1 according to the first embodiment.

Next, the printing process of the printer system 1 will be described. FIG. 2 is a flowchart indicating the operation of the printer system 1 according to the first embodiment. As shown in FIG. 2, when the printing process starts, the print data expressed as page description language are converted into the bit map data by the host 2 (step $S_1$). The bit map data are compressed (step $S_2$) and stored in the page buffer 24 of the host 2 (step $S_3$). The host 2 then sends the bit map data to the printer 3 (step $S_4$). After sending the bit map data, the bit map data continue to be kept in the page buffer 24 of the host 2 (step $S_5$).

The bit map data sent from the host 2 are received by the printer 3 and stored in the receiving buffer 11 (step $S_6$). Afterwards, the bit map data stored in the receiving buffer are expanded (step $S_7$) and converted into the line unit data (step $S_8$) by the CPU 7 of the printer 3. The line unit data are transferred to and stored in the band buffer 12 (step $S_9$). Afterwards, the one-line printing process of the image in accordance with the line unit data is conducted by the image forming section 14 of the engine 5 (step $S_{10}$). The bit map data used by the one-line printing process are erased from the receiving buffer 11 and the line unit data used by the one-line printing process are erased from the band buffer 12 (step $S_{11}$). Until the image forming process for one page is completed, the steps $S_6$ through $S_{11}$ are repeated (step $S_{12}$). If the image forming process for one page is completed, the paper is conveyed by the paper conveyer 15 toward the detect position of the sensor 16 (step $S_{13}$).

The CPU 7 determines whether or not a paper jam has occurred on the paper conveyer 15 on the basis of the signal outputted from the sensor 16 (step $S_{14}$). When the CPU 7 determines that a paper jam has occurred, the CPU 7 of the printer 3 sends the jam detect signal to the host 2. The host 2 determines whether or not the jam detect signal has been received from the printer 3 (step $S_{15}$). If the jam detect signal has been received, the process of the host 2 returns to the step $S_4$ and the host 2 again transmits the bit map data of the jammed page kept in the page buffer 24 to the printer 3 (step $S_4$). Afterwards, as described above, the bit map data continue to be kept in the page buffer 24 of the host 2 and the printer 3 repeats the steps $S_6$–$S_{12}$.

If normal paper ejection signal is received from the printer 3 by the host 2 (step $S_{15}$), the host 2 erases the bit map data of the printed page kept in the page buffer 24 (step $S_{16}$). Next, the host 2 determines whether or not there is a succeeding page to be printed (step $S_{17}$). If a succeeding page is present, the process of the host 2 returns to the step $S_1$. On the other hand, if a succeeding page is absent, the process of the host 2 is ended.

If the CPU 7 determines no paper jam is detected at step $S_{14}$, the printer 3 determines whether or not there is a succeeding page to be printed (step $S_{18}$). If a succeeding page is present, the process of the printer 3 returns to the step $S_6$. On the other hand, if a succeeding page is absent, the process of the printer 3 is ended.

Figure 3:
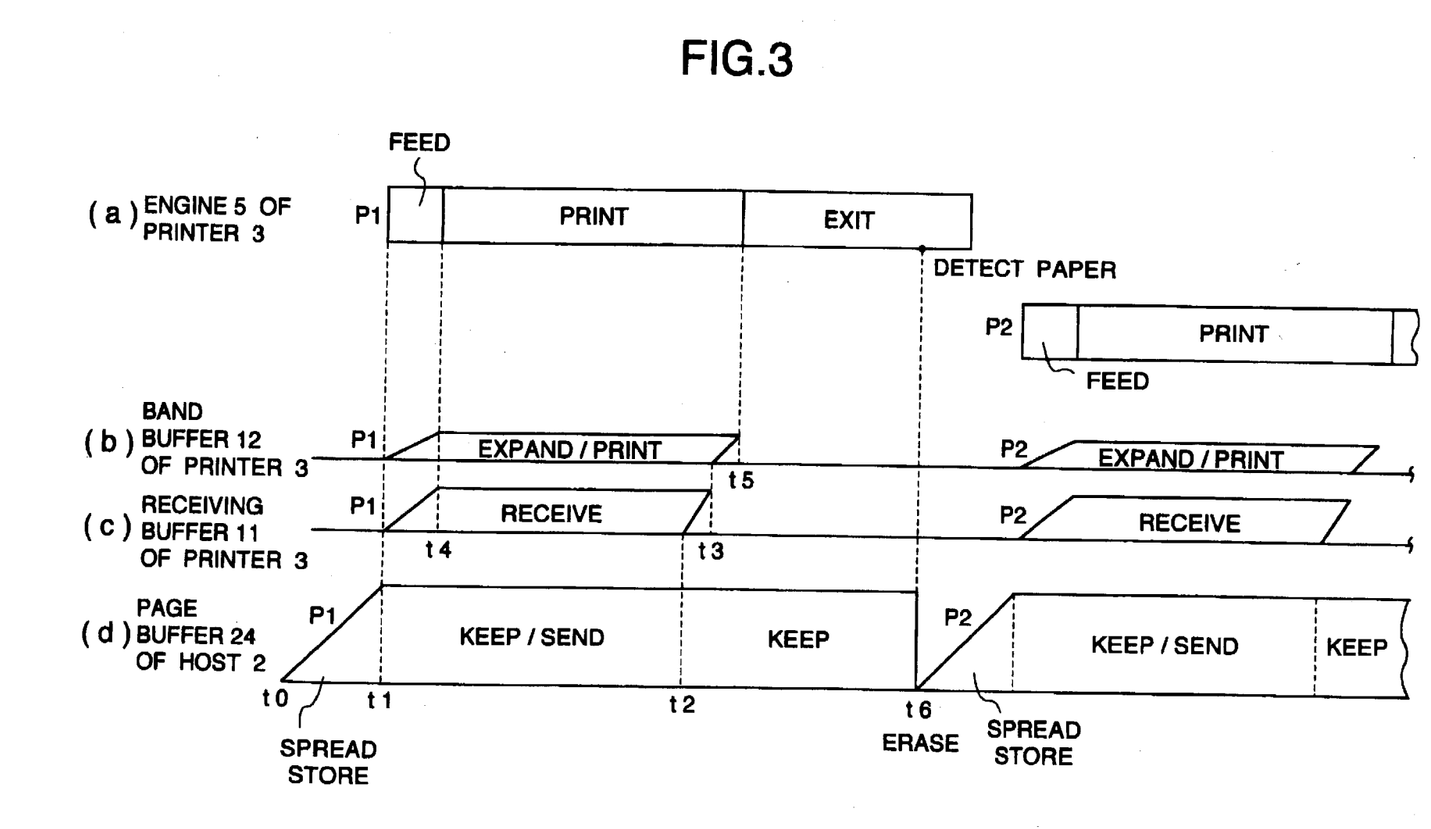
FIG. 3 is a timing chart indicating the normal printing operation of the printer system 1 according to the first embodiment when no paper jam has occurred.
Figure 4:
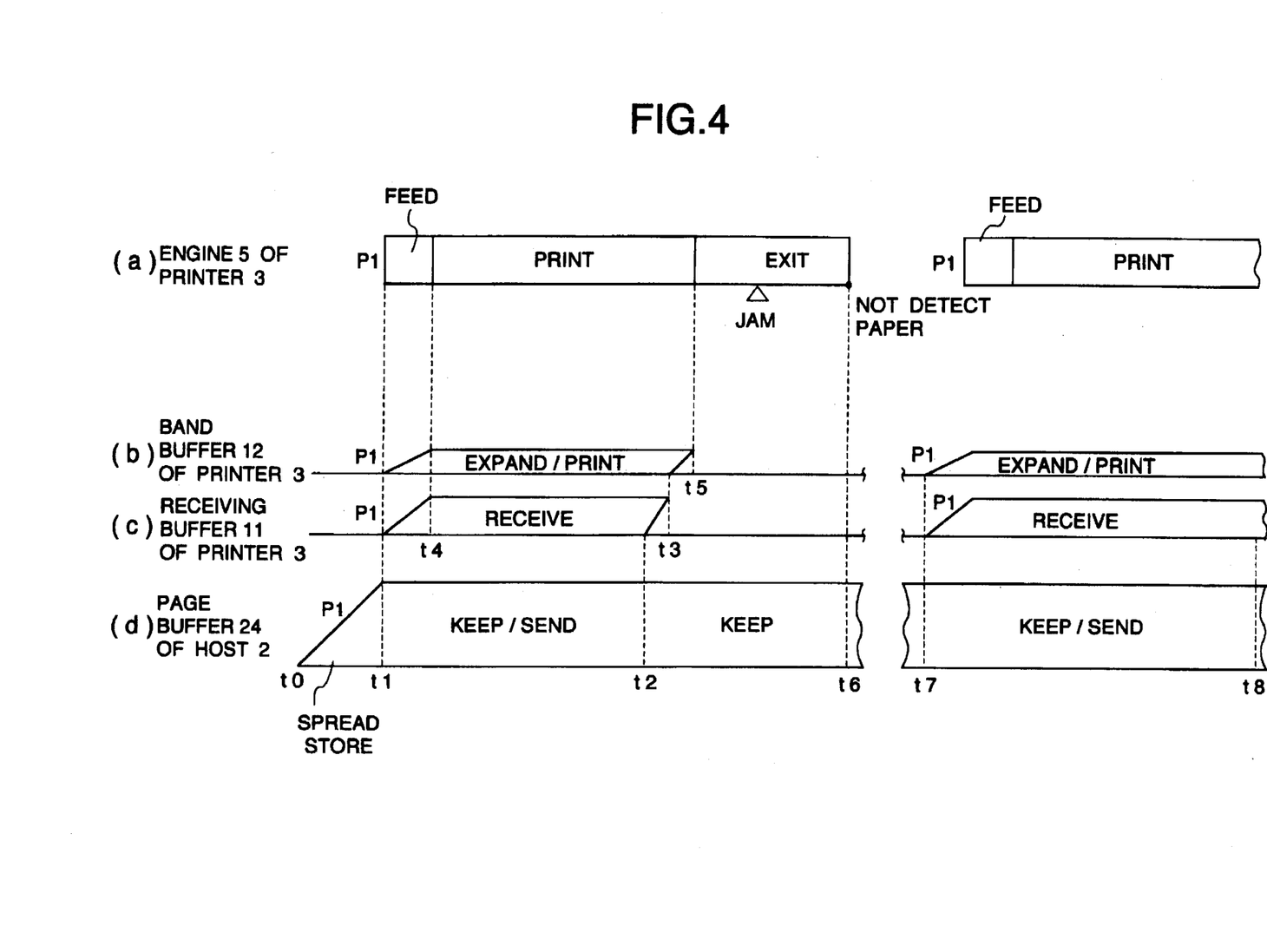
FIG. 4 is a timing chart indicating the recovery operation of the printer system 1 according to the first embodiment when a paper jam has occurred.

A more detailed description of the printing operation of the printer system 1 will be described with reference to FIG. 3 and FIG. 4. FIG. 3 is a timing chart indicating the normal printing operation when no paper jam has occurred, while FIG. 4 is a timing chart indicating the printing operation including a recovery process in the event a paper jam has occurred. In respective FIG. 3 and FIG. 4, (a) shows the operation of the image forming section 14 and the paper conveyer 15 in the engine 5 of the printer 3, (b) shows the operation of the band buffer 11 In the control section 4 of the printer 3, (c) shows the operation of the receiving buffer 12 in the control section 4 of the printer 3, and (d) shows the operation of the page buffer 13 in the host 2.

First, the case will be described when no paper jam has occurred and the paper is normally conveyed by the paper conveyer 15 and ejected from the printer 3. As indicated in (d) of FIG. 3, during the period of time $t_0$–$t_1$, print data expressed by page description language of a first page $P_1$ are spread as the bit map data, and the bit map data are stored In the page buffer 24 of the host 2. When the bit map data for one page has been stored in the page buffer 24, the host 2 sends the bit map data toward the receiving buffer 11 of the printer 3 during the period of time $t_1$–$t_2$.

As indicated in (c) of FIG. 3, during the period of time $t_1$–$t_2$, the receiving buffer 11 of the printer 3 receives the bit map data and transfers the bit map data in real time to the band buffer 11. As indicated in (b) of FIG. 3, the bit map data sent from the receiving buffer 11 are expanded and converted into the line unit data, and the line unit data are stored In the band buffer 12 during the period of time $t_1$–$t_3$. As indicated in (a) of FIG. 3, at the time $t_1$, the paper conveyer 15 of the engine 5 begins conveying the paper which has no printed image. When a predetermined quantity of the line unit data are stored in the band buffer 11, the image forming process is conducted during the period of time $t_4$–$t_5$. When the image forming process of the first page $P_1$ is completed, all the bit map data stored in the receiving buffer 11 and all the line unit data stored in the band buffer 12 are erased at the time $t_5$.

After the image forming process is completed at the time $t_5$, the paper which has a printed image is ejected from the printer 3 to the exit tray by the paper conveyer 15. However, as indicated in (d) of FIG. 3, the page buffer 24 of the host 2 continues to keep the bit map data of the first page $P_1$ until the time $t_6$. The paper is conveyed normally In the conveying path and passes the detect position of the sensor 16 disposed prior to the exit at the time $t_6$. The printer 3 transmits a signal to the host 2 indicating the paper has normally ejected from the printer 3 without occurrence of a paper jam. When the host 2 receives the signal indicating normal exit, the bit map data of the first page $P_1$ kept in the page buffer 24 are erased at the time $t_6$ as shown in (d) of FIG. 3, and the bit map data of the succeeding second page $P_2$ are produced and stored in the page buffer 24. Thereafter, the same printing operation as for the first page $P_1$ is repeated for the second page $P_2$ and subsequent pages.

Next, the case will be described in the event a paper jam has occurred after an image forming process. As shown in FIG. 4, the operation of the printer system 1 during the period of time $t_0$–$t_5$ is the same as that of FIG. 3.

If a paper jam has occurred during paper transport, the paper fails to pass the detect position of the sensor 16 disposed immediately prior to the exit at the time $t_6$. Since the sensor 16 fails to detect the paper, the CPU 7 of the printer 3 confirms a paper jam has occurred and transmits a jam detect signal for notifying the host 2 of occurrence of the paper jam. The host 2 receives the jam detect signal at the time $t_6$. In this case, the bit map data of the first page $P_1$ continue to be kept in the page buffer 24 of the host 2. The printer system 1 informs the operator of occurrence of the paper jam by an indicating lamp or warning sound, and a pause mode is produced. When the operator removes the jammed paper and resumes printing operation, the host 2 again transmits the bit map data of the first page $P_1$ kept In the page buffer 24 to the receiving buffer 11 of the printer 3 during the period of time $t_7$–$t_8$, whereupon the same operation as shown in the period of time $t_1$–$t_6$ is repeated.

As described above, the bit map data for one page continue to be kept in the page buffer 24 of the host 2 until the paper exits without paper jam detection. Accordingly, even if the receiving buffer 11 and the band buffer 12 have little storage capacities, the recovery function can be obtained. In addition, since the print data expressed as page description language are converted into the bit map data by the host 2, the CPU 7 of the printer 3 does not require high performance, while a small capacity program ROM 8 can also be used.

Second Embodiment

Figure 5:
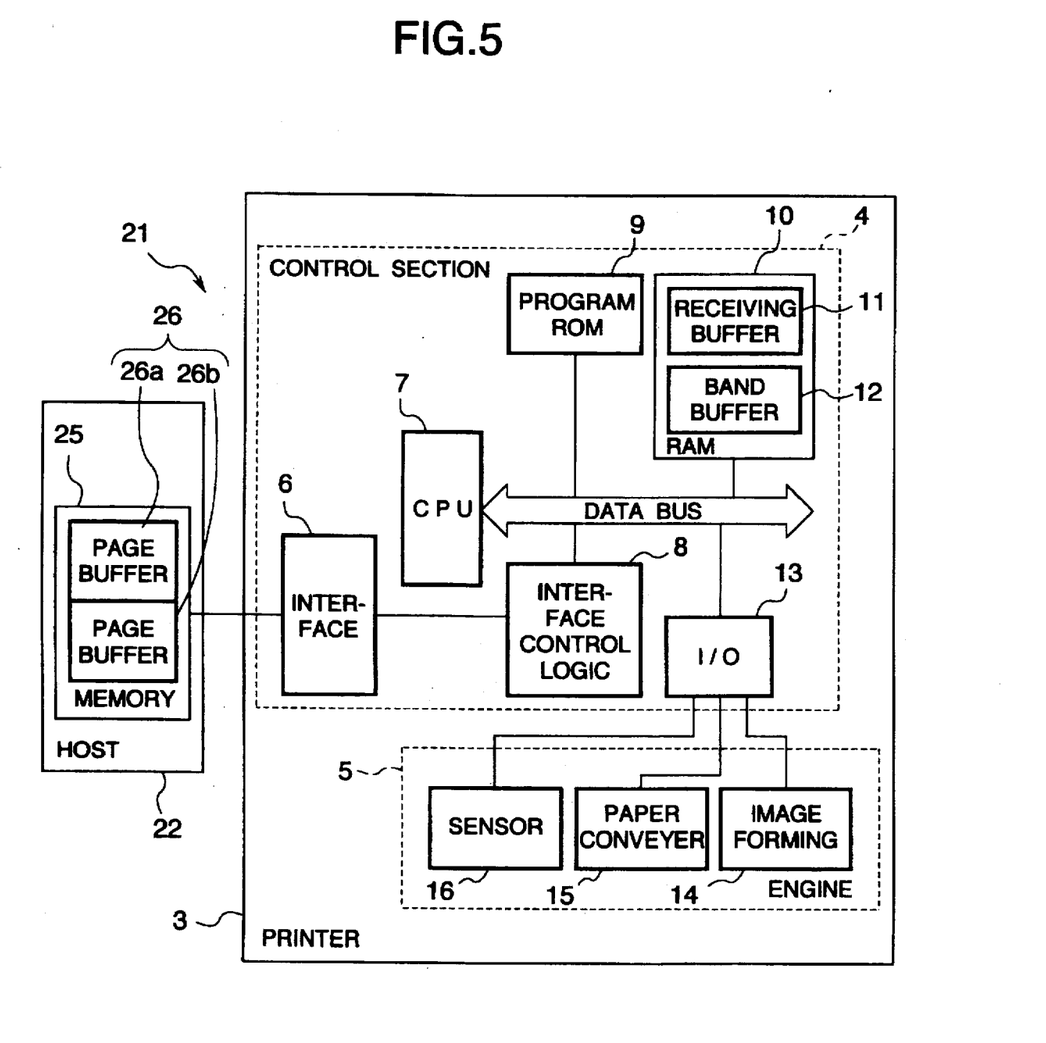
FIG. 5 is a block diagram showing construction of a printer system 21 according to a second embodiment of the present invention.

FIG. 5 is a block diagram showing construction of a printer system 21 according to a second embodiment. In FIG. 5, the same symbols are used to designate the same or corresponding parts as indicated in FIG. 1. The printer system 21 of the second embodiment differs from the printer system 1 of the first embodiment (FIG. 1 to FIG. 4) in respects that a pair of page buffers 26a and 26b(or 26) are provided in a memory 25 of a host 22 and the program ROM 9 of the printer 3 has a different program content.

Figure 6:
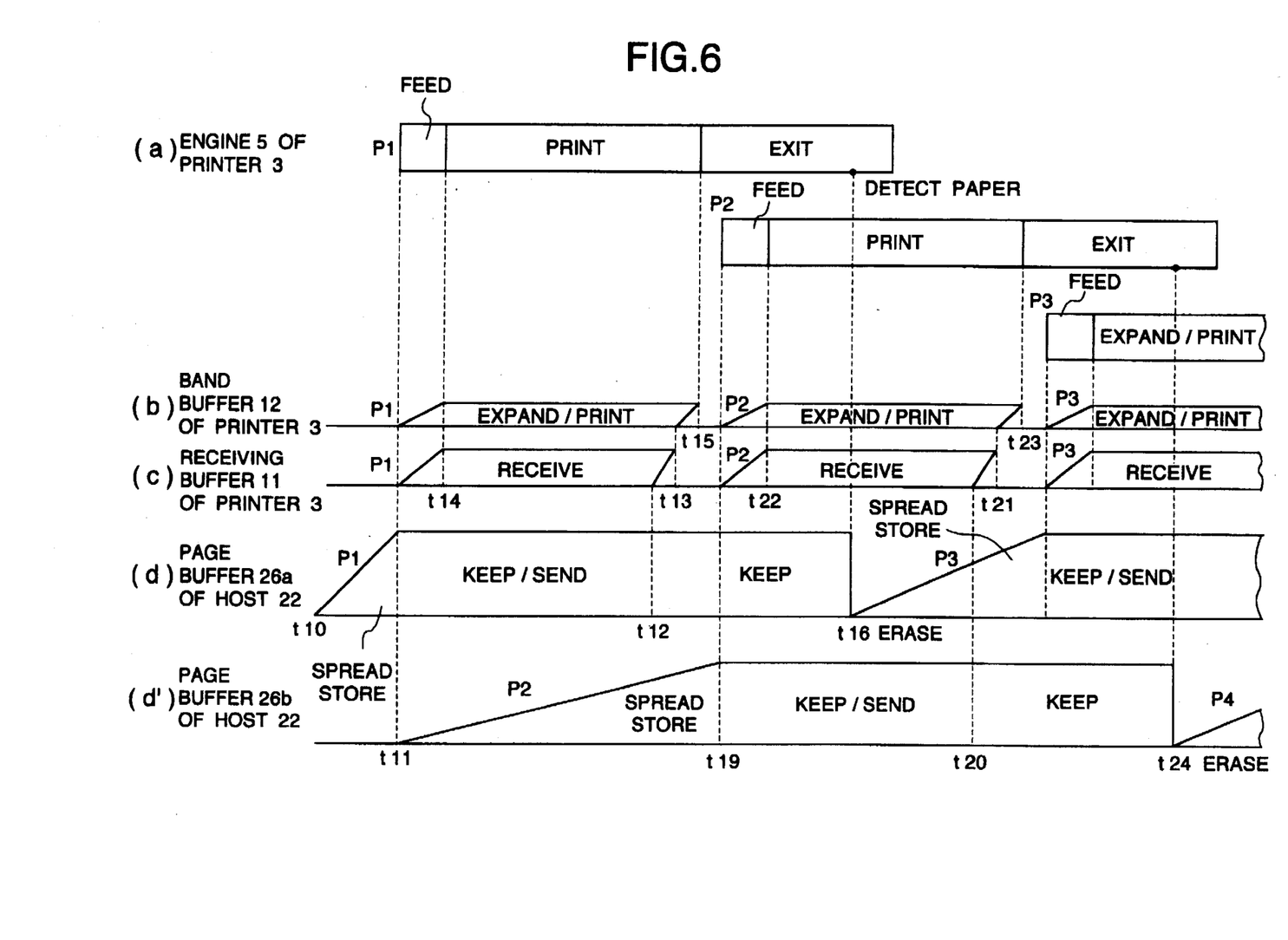
FIG. 6 is a timing chart indicating the normal printing operation of the printer system 21 according to the second embodiment when no paper jam has occurred.
Figure 7:
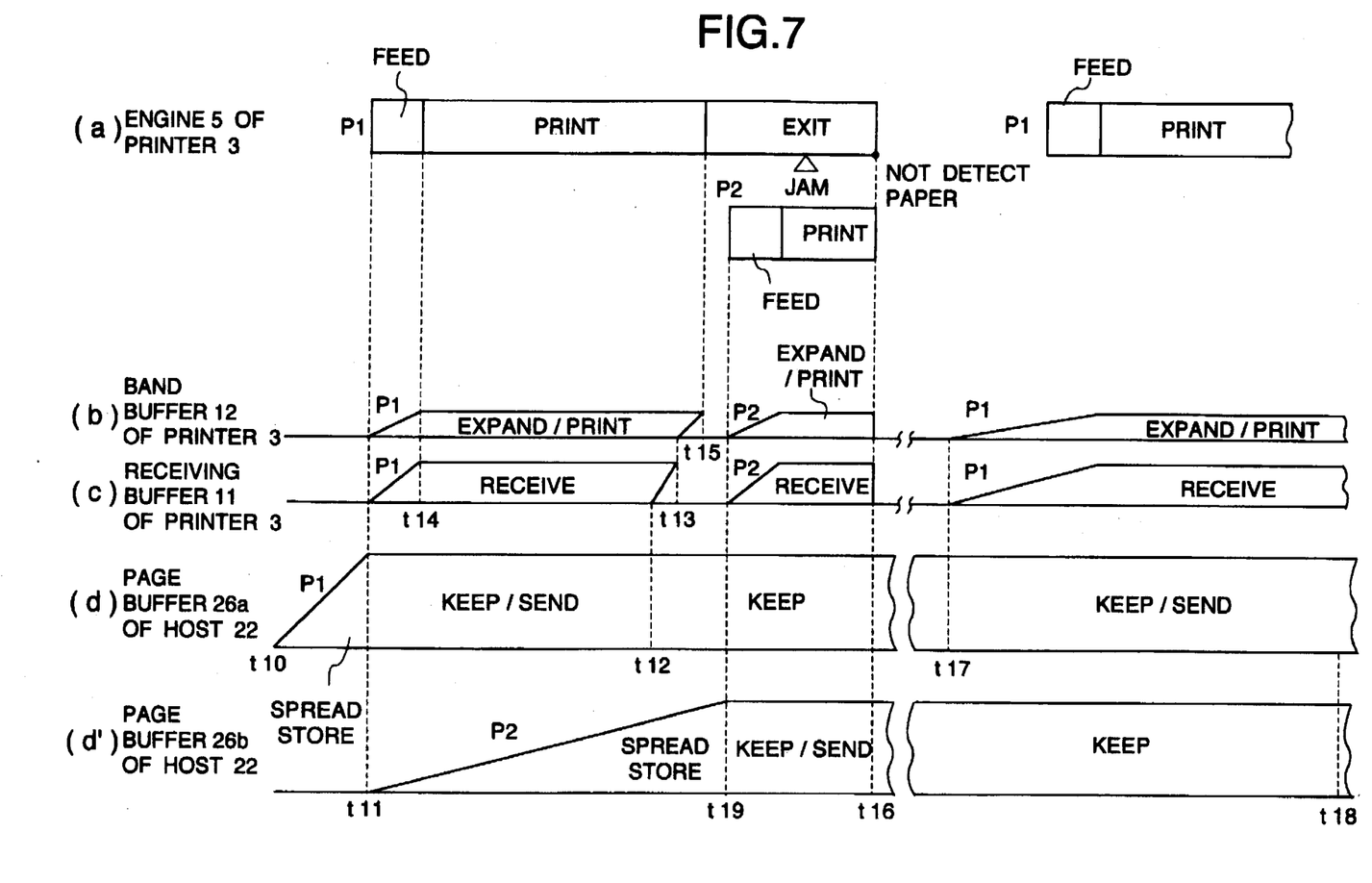
FIG. 7 is a timing chart indicating the recovery operation of the printer system 21 according to the second embodiment when a paper jam has occurred.

FIG. 6 is a timing chart indicating the normal printing operation when no paper jam has occurred, while FIG. 7 is a timing chart indicating the printing operation including a recovery process in the event a paper jam has occurred. In respective FIG. 6 and FIG. 7, (a) shows the operation of the image forming section 14 and the paper conveyer 15 in the engine 5 of the printer 3, (b) shows the operation of the band buffer 11 in the control section 4 of the printer 3, (c) shows the operation of the receiving buffer 12 in the control section 4 of the printer 3, (d) shows the operation of the first page buffer 26a in the host 2, and (d') shows the operation of the second page buffer 26b in the host 2.

First, the case will be described when no paper jam has occurred and the paper is normally conveyed by the paper conveyer 15 and ejected from the printer 3. As indicated in (d) of FIG. 6, during the period of time $t_{10}$–$t_{11}$, print data expressed by page description language of a first page $P_1$ are converted into the bit map data, and the bit map data are stored in the first page buffer 26a of the host 2. After the bit map data for one page have been stored in the first page buffer 26a, the host 2 sends the bit map data toward the receiving buffer 11 of the printer 3 during the period of time $t_{11}$–$t_{12}$.

As indicated in (c) of FIG. 6, during the period of time $t_{11}$–$t_{12}$, the receiving buffer 11 of the printer 3 receives the bit map data and transfers the bit map data in real time to the band buffer 11. As indicated in (d) of FIG. 6, the bit map data sent from the receiving buffer 11 are expanded and converted into the line unit data, and the line unit data are stored in the band buffer 12 during the period of time $t_{11}$–$t_{13}$. As indicated in (a) of FIG. 6, at the time $t_{11}$, the paper conveyer 15 of the engine 5 begins conveying the paper which has no printed image. When a predetermined quantity of the line unit data are stored in the band buffer 11, the image forming process is conducted during the period of time $t_{14}$–$t_{15}$. When the image forming process of the first page $P_1$ is completed, all the bit map data stored in the receiving buffer 11 and all the line unit data stored in the band buffer 12 are erased at the time $t_{15}$.

After the image forming process for the first page $P_1$ is completed at the time $t_{15}$, the paper which has a printed image is conveyed toward the exit tray of the printer 3 by the paper conveyer 15. However, as indicated in (d) of FIG. 6, the first page buffer 26a of the host 2 continues to keep the bit map data of the first page $P_1$ until the time $t_{16}$. Afterwards the paper is conveyed normally in the conveying path and passes the detect position of the sensor 16 disposed prior to the exit at the time $t_{16}$. When no paper jam is detected, the printer 3 does not transmit a jam absent signal to the host 2. By the way, this process can be also applied to the first embodiment. The purpose is to avoid an undesirable large load on the CPU 7 at the time $t_{16}$ by transmitting a signal while the printer 3 is receiving the bit map data for a second page $P_2$ as described below. In other words, when no paper jam has occurred, the signal is not sent to the host 2, while the signal is sent to notify the host 2 only when a paper jam has occurred. Therefore, when there is an unoccupied signal line for connecting the host 2 and the printer 3 (i.e., when the bit map data are not transmitted form the host 2 to the printer 3 as shown in FIG. 6 as the period of time $t_{15}$–$t_{19}$), the host 2 receives the end timing $t_{15}$ of the image forming process of the first page $P_1$ and in reference thereof, if a jam signal is not received for a predetermined length of time, normal paper exit is interpreted and the bit map data of the first page $P_1$ kept In the first page buffer 26a are erased at the time $t_{16}$ in (d) of FIG. 6. After erasing the bit map data of the first page $P_1$ from the page buffer 26a, as indicated in (d) of FIG. 6, the bit map data for the third page $P_3$ are produced and stored In the first page buffer 26a.

On the other hand, as indicated in (d') of FIG. 6, during the period of time $t_{11}$–$t_{19}$, print data expressed by page description language of a second page $P_2$ are converted into the bit map data, and the bit map data are stored in the second page buffer 26b of the host 2. When the bit map data for one page have been stored in the second page buffer 26b, the host 2 sends the bit map data toward the receiving buffer 11 of the printer 3 during the period of time $t_{19}$–$t_{20}$.

As shown in (c) of FIG. 6, during the period of time $t_{19}$–$t_{20}$, the receiving buffer 11 of the printer 3 receives the bit map data and transfers the bit map data in real time to the band buffer 11. As indicated in (b) of FIG. 6, the bit map data sent from the receiving buffer 11 are expanded and converted into the line unit data, and the line unit data are stored in the band buffer 12 during the period of time $t_{19}$–$t_{20}$. As indicated in (a) of FIG. 6, at the time $t_{19}$, the paper conveyer 15 of the engine 5 begins conveying the succeeding paper which has no printed image. When a predetermined quantity of the line unit data are stored In the band buffer 11, the image forming process is conducted during the period of time $t_{22}$–$t_{23}$. After the image forming process of the second page $P_2$ is completed, all the bit map data kept in the receiving buffer 11 and all the line unit data kept in the band buffer 12 are erased at the time $t_{23}$.

After the image forming process for the second page $P_2$ is completed at the time $t_{23}$, the paper which has a printed image is conveyed toward the exit tray by the paper conveyer 15. However, as indicated in (d') of FIG. 6, the page buffer 26b of the host 2 continues to keep the bit map data of the second page $P_2$ until the time $t_{24}$. Afterwards the paper is conveyed normally in the conveying path and passes the detect position of the sensor 16 disposed prior to the exit at the time $t_{24}$. When no paper jam is detected, the printer 3 does not transmit a jam absent signal to the host 2 because of the above-mentioned reason. If a jam signal is not received for a predetermined length of time, normal paper exit is interpreted and the bit map data of the second page $P_2$ kept in the second page buffer 26b are erased at the time $t_{24}$ in (d') of FIG. 6. After erasing the bit map data of the second page $P_2$ from the second page buffer 26b, as indicated in (d') of FIG. 6, the bit map data for the fourth page $P_4$ are produced and stored in the second page buffer 26b. The above-mentioned processes for the first and second pages are repeated for the subsequent pages.

Next, the case will be described when a paper jam has occurred after an image forming process. FIG. 7 is a timing chart showing the operation in the event a paper jam has occurred during transport. As shown in FIG. 7, the operation of the printer system 21 during the period of time $t_{11}$–$t_{15}$ is the same as that of FIG. 6.

If a paper jam has occurred during the paper transport, the paper fails to pass the detect position of the sensor 16 disposed immediately prior to the exit at the time $t_{16}$. The printer 3 thereby confirms a paper jam has occurred and transmits a paper jam notifying signal to the host 2. The host 2 receives the paper jam signal at the time $t_{16}$. In this case, the bit map data of the first page $P_1$ continue to be kept in the first page buffer 26a of the host 2. The printer system 21 informs the operator of occurrence of the paper jam by an indicating lamp or warning sound, and a pause mode is produced. When the operator removes the jammed paper and resumes printing operation, the host 2 again transmits the bit map data of the first page $P_1$ kept in the first page buffer 26a to the receiving buffer 11 of the printer 3 during the period of time $t_{17}$–$t_{18}$, whereupon the operation during the period of time $t_{11}$–$t_{16}$ is repeated.

As described above, the bit map data for one page continue to be kept in the page buffer 26a or 26b of the host 2 until the paper exits without paper jam detection. Accordingly, even if the receiving buffer 11 and the band buffer 12 have little storage capacities, the recovery function can be obtained. In addition, since the print data expressed as page description language are converted into the bit map data by the host 2, the CPU 7 of the printer 3 does not require high performance, while a small capacity program ROM 8 can also be used.

In addition, since the printer system 21 of the second embodiment comprises two page buffers 26a and 26b in the host 2, it is possible to alternately perform the process of spreading and storing the bit map data and sending the bit map data, thereby providing an advantage of higher speed printing.

Third Embodiment

Figure 8:
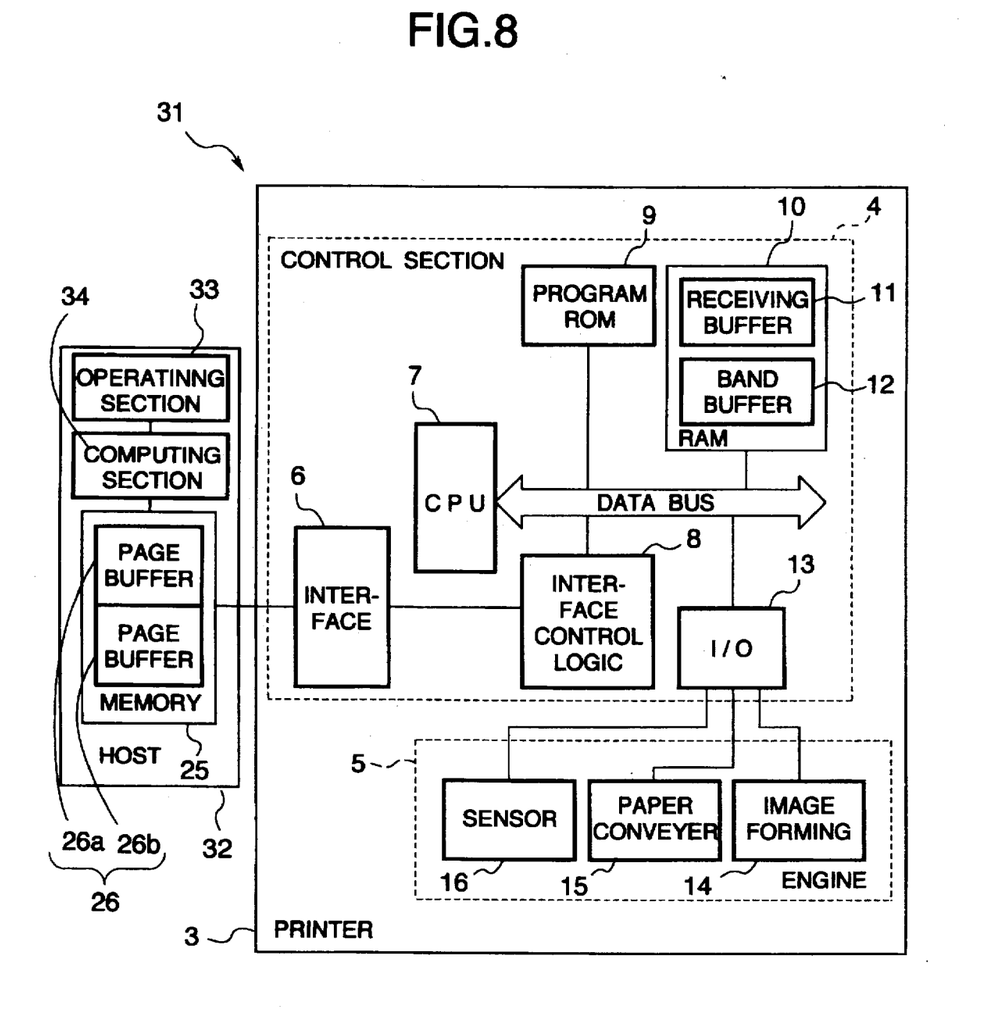
FIG. 8 is a block diagram showing construction of a printer system 31 according to a third embodiment of the present invention.

FIG. 8 is a block diagram showing construction of a printer system 31 according to the third embodiment. FIG. 8, the same symbols are used to designate the same or corresponding parts as indicated in FIG. 5. The printer system 31 of the third embodiment differs from that of the second embodiment (FIG. 5) in the following points. First, the printer system 31 of the third embodiment has two operating modes including a low speed mode in which the page buffer 26 are utilized as one area and a high speed mode in which the page buffer 26 are utilized as two areas 26a and 26b as described in the second embodiment. When the low speed mode is selected, the printer system 31 operates in the same manner as the system of the first embodiment. On the other hand, when the high speed mode is selected, the printer system operates in the same manner as the system of the second embodiment. Secondly, an operating mode can be changed on the basis of computation in a computing section 34 using information inputted from an operating section 33.

In the printer system 31, the computing section 33 computes how many page buffers can be set in the memory 25 from the storage capacity of the memory 25, paper size and dot density. If the computed page buffer quantity is one area, the low speed mode is selected, and if two or more areas, the high speed printing mode is selected. Other elements of construction, printing operation and recovery process of the printer system 31 according to the third embodiment are basically the same as described for the first and second embodiments.

Figure 9:
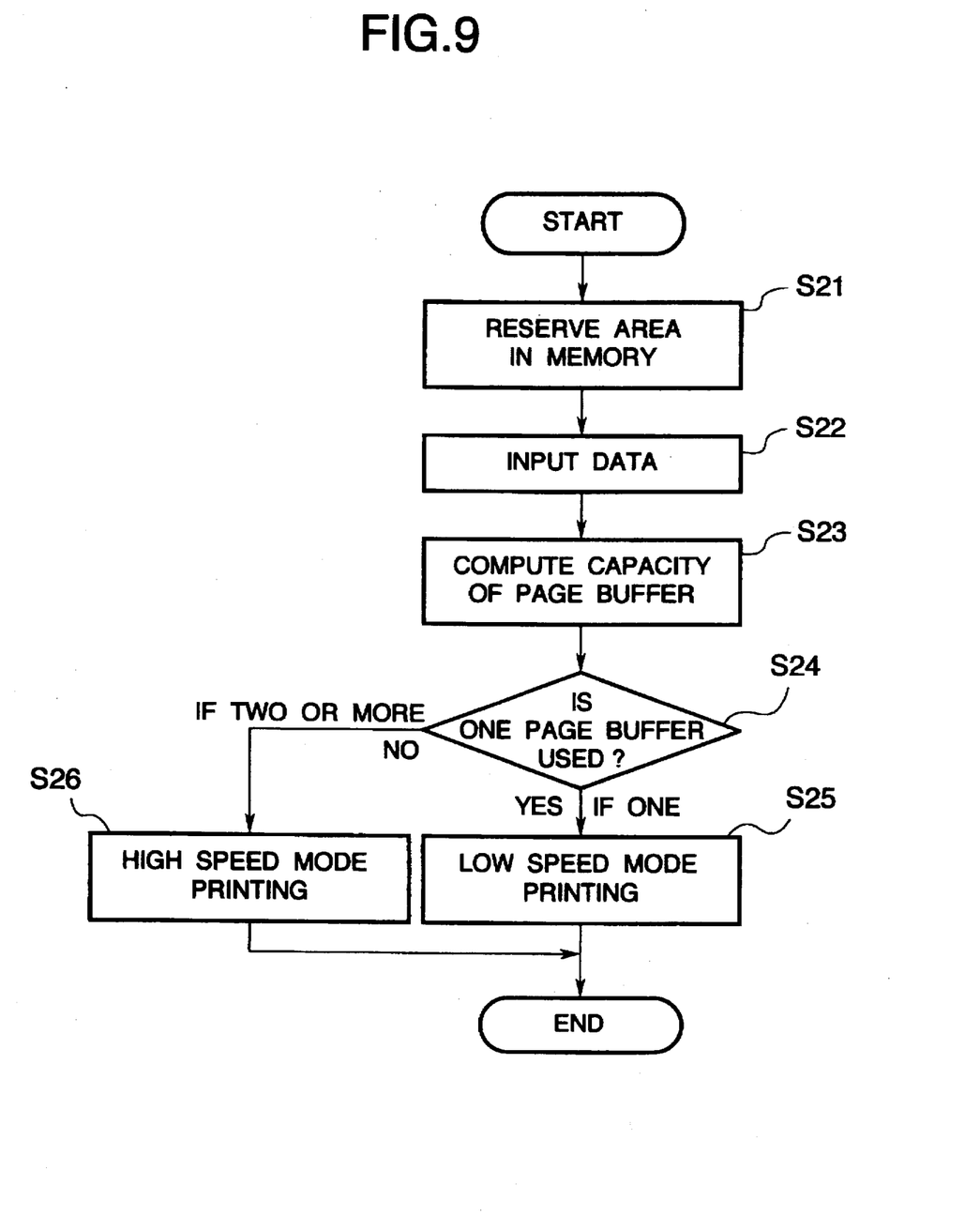
FIG. 9 is a flowchart indicating the operation of the printer system 31 according to the third embodiment.

FIG. 9 is a flowchart showing the operation of the third embodiment. As indicated in FIG. 9, at the start of printing, the host 2 reserves the area in the memory 25 usable as the page buffer 26 (26a, 26b) (step $S_{21}$). The operator enters the paper size and dot density from operating section 33 of the host 2 or the operating section (not shown) of the printer 3. The printer system 31 registers the paper size and dot density data (step $S_{22}$) and the computing section 34 computes capacity of the page buffer 26 (step $S_{23}$).

Whether only one page buffer should be used or two or more page buffers should be used is determined on the basis of the computed capacity and the usable area in the memory 25 reserved at step $S_{21}$ (step $S_{24}$). The printer system 31 selects a low speed mode printing if only one page buffer is used (step $S_{25}$), and a high speed mode if two or more page buffers are used (step $S_{26}$). If even one page buffer cannot be reserved in the memory 25, printing is performed without the recovery function.

As described above, according to the third embodiment, the expensive memory 25 can be utilized effectively by setting the suitable number of the buffer areas.

Also, prior to the printing operation, the operator can select whether or not to perform the recovery operation by the operating section 33. When the printing operation with the recovery function is selected, the printer system 31 operates as indicated in FIG. 9. When the printing operation without the recovery function is selected, a part of the memory 25 can be used for another job in the host 32, thereby accomplishing effective utilization of the memory 25.

What is claimed is:

1. A printer system comprising a host and a printer;
   said host including a page buffer for storing bit map data for one page or more, said bit map data stored in said page buffer being sent to said printer by said host; and
   said printer including:
   a controller;
   a receiving buffer for temporarily storing said bit map data sent from said page buffer;
   a band buffer for temporarily storing line unit data for several lines in a main scanning direction, said line unit data being produced from said bit map data stored in said receiving buffer by said controller;
   a paper conveyer for conveying a paper;
   an image forming section for conducting an one-line printing process in the main scanning direction based on said line unit data to form an image on the paper; and
   a sensor for detecting the paper passing through a predetermined position which is downstream in a paper conveying direction from said image forming section;
   wherein, immediately after said one-line printing process is conducted, said line unit data used for said one-line printing process are erased from said band buffer, said bit map data used for said one-line printing process are erased from said receiving buffer, but said bit map data stored in said page buffer continue to be kept; and
   wherein, if said controller judges that a paper jam has occurred on the basis of a signal sent from said sensor, said bit map data of a jammed page kept in said page buffer are sent again to said receiving buffer by said host, and if said controller judges that no paper jam has occurred on the basis of the signal sent from said sensor, said bit map data of a printed page are erased from said page buffer.

2. The printer system of claim 1, wherein, if said controller judges that the paper jam has occurred, said controller sends a signal for notifying said host of occurrence of the paper jam, and if said controller judges that no paper jam has occurred, said controller sends a signal for notifying said host of no paper jam.

3. The printer system of claim 1, wherein, if said controller judges that the paper jam has occurred, said controller sends a signal for notifying said host of occurrence of the paper jam, and if said controller judges that no paper jam has occurred, said controller fails to send a signal for notifying said host of no paper jam.

4. The printer system of claim 1, wherein said one-line printing process forms a part of an electrophotographic process to form an electrostatic latent image.

5. A printer system comprising a host and a printer;
   said host including a first page buffer for storing bit map data of a first page and a second page buffer for storing bit map data of a second page, said bit map data stored in said first and second page buffers being alternately sent to said printer by said host; and
   said printer including:
   a controller;
   a receiving buffer for temporarily storing the bit map data of the first page from the first page buffer or the bit map data of the second page from the second page buffer;
   a band buffer for temporarily storing line unit data for several lines in a main scanning direction, said line unit data being produced from said bit map data stored in said receiving buffer, by said controller;
   a paper conveyer for conveying a paper;
   an image forming section for conducting an one-line printing process in the main scanning direction based on said line unit data to form an image on the paper; and
   a sensor for detecting the paper passing through a predetermined position which is downstream in a paper conveying direction from said image forming section;
   wherein the bit map data of the first page are sent from said first page buffer and stored in said receiving buffer, said line unit data are produced from the bit map data stored in said receiving buffer and stored in said band buffer, said one-line printing process for the first page is conducted by said image forming section, said line unit data used for said one-line printing process are erased from said band buffer, said bit map data used for said one-line printing process are erased from said receiving buffer, and said bit map data of said second page are sent from said second page buffer and stored in said receiving buffer, but said bit map data of said first page continue to be kept in said first page buffer; and
   wherein, if said controller judges that a paper jam of said first page has occurred on the basis of a signal sent from said sensor, said bit map data of said first page kept in said first page buffer are sent again to said receiving buffer by said host, and if said controller judges that no paper jam has occurred when conveying said first page on the basis of a signal sent from said sensor said bit map data of a printed page kept in said first page buffer are erased.

6. The printer system of claim 5, wherein, if said controller judges that the paper jam has occurred when conveying, said controller sends a signal for notifying said host of occurrence of the paper jam, and if said controller judges that no paper jam has occurred, said controller sends a signal for notifying said host of no paper jam.

7. The printer system of claim 5, wherein, if said controller judges that the paper jam has occurred, said controller sends a signal for notifying said host of occurrence of the paper jam, and if said controller judges that no paper jam has occurred, said controller fails to send a signal for notifying said host of no paper jam.

8. The printer system of claim 5, wherein said one-line printing process forms a part of an electrophotographic process to form an electrostatic latent image.

9. The printer system of claim 5, further comprising a computing section for computing how many page buffers can be set within a memory of said host and selecting a printing speed.

10. A printing method of a printer system comprising a host and a printer, said printing method comprising the steps of:
 (a) causing bit map data for one page or more to store in a page buffer of said host;
 (b) sending the bit map data stored in said page buffer to said printer by said host;
 (c) causing the bit map data to temporarily store in a receiving buffer of said printer;
 (d) producing line unit data from the bit map data stored in said receiving buffer by a controller of said printer;
 (e) causing by said controller the line unit data for several lines in a main scanning direction to temporarily store in a band buffer of said printer;
 (f) conducting with an image forming section of said printer an one-line printing process in the main scanning direction based on the line unit data stored in said band buffer to form an image on a paper;
 (g) subsequently erasing said line unit data used for said one-line printing process from said band buffer, and said bit map data used for said one-line printing process from said receiving buffer wherein said bit map data stored in said page buffer continue to be kept;
 (h) repeating said steps (d) to (g) until said one-line printing process is completed for one page; and
 (i) detecting by a sensor of said printer the paper passing through a predetermined position which is downstream in a paper conveying direction from said image forming section;
 wherein, if said controller judges that a paper jam has occurred on the basis of a signal sent from said sensor, said bit map data of a jammed page kept in said page buffer are sent again to and stored in said receiving buffer, and
 if said controller judges that no paper jam has occurred on the basis of the signal sent from said sensor, said bit map data of a printed page kept in said page buffer are erased and returns to said step (a) when a succeeding page to be printed is present.

11. The printing method of claim 10, wherein, if said controller judges that the paper jam has occurred, said controller sends a signal for notifying said host of occurrence of the paper jam, and if said controller judges that no paper jam has occurred, said controller sends a signal for notifying said host of no paper jam.

12. The printing method of claim 10, wherein, if said controller judges that the paper jam has occurred, said controller sends a signal for notifying said host of occurrence of the paper jam, and if said controller judges that no paper jam has occurred, said controller fails to send a signal for notifying said host of no paper jam.

13. The printing method of claim 10, wherein said one-line printing process forms a part of an electrophotographic process to form an electrostatic latent image.

14. A printing method of a printer system comprising a host and a printer, said printing method comprising the steps of:
 (a) if a first page buffer of said host vacant, causing bit map data to store in said first page buffer;
 (b) if a second page buffer of said host is vacant, causing bit map data to store in said second page buffer;
 (c) if printing the first page sending the bit map data stored in said first page buffer to said printer by said host, and if printing the second page, sending the bit map data stored in said second page buffer to said printer by said host;
 (d) causing the bit map data to temporarily store in a receiving buffer of said printer;
 (e) producing line unit data from the bit map data stored in said receiving buffer, by a controller of said printer;
 (f) causing by said controller the line unit data for several lines in a main scanning direction to temporarily store in a band buffer of said printer;
 (g) conducting an one-line printing process in the main scanning direction based on the line unit data stored in said band buffer, by an image forming section of said printer, to form an image on a paper;
 (h) subsequently erasing said line unit data used for said one-line printing process from said band buffer, and said bit map data used for said one-line printing process from said receiving buffer;
 (i) repeating said steps (e) to (h) until said one-line printing process is completed for one page;
 (j) detecting by a sensor of said printer the paper passing through a predetermined position which is downstream in a paper conveying direction from said image forming section;
 (k) in parallel with said step (j), sending the bit map data of the second page stored in said second page buffer to said printer, by said host;
 wherein, if said controller judges that a paper jam has occurred on the basis of a signal sent from said sensor, and the bit map data kept in said first page buffer are sent again to and stored in said receiving buffer by said host, the method returns to said step (e); and
 if said controller judges that no paper jam has occurred on the basis of a signal sent from said sensor, and said bit map data of a printed page kept in said first page buffer are erased, returns to said step (a) when a succeeding page is present.

15. The printing method of claim 14, wherein, if said controller judges that the paper jam has occurred when conveying, said controller sends a signal for notifying said host of occurrence of the paper jam, and if said controller judges that no paper jam has occurred, said controller sends a signal for notifying said host of no paper jam.

16. The printing method of claim 14, wherein, if said controller judges that the paper jam has occurred, said controller sends a signal for notifying said host of occurrence of the paper jam, and if said controller judges that no paper jam has occurred, said controller fails to send a signal for notifying said host of no paper jam.

17. The printing method of claim 14, wherein said one-line printing process forms a part of an electrophotographic process to form an electrostatic latent image.

18. The printing method of claim 14 further comprising the steps of computing how many page buffers can be set within a memory of said host and selecting a printing speed.

* * * * *